US009129327B1

(12) United States Patent
Cheung et al.

(10) Patent No.: US 9,129,327 B1
(45) Date of Patent: Sep. 8, 2015

(54) SCREENSHOT-BASED E-COMMERCE

(71) Applicant: Splendid Labs, Inc., San Francisco, CA (US)

(72) Inventors: Dan Cheung, San Francisco, CA (US); Eric Roland Goldberg, San Francisco, CA (US); Shan Shrikant Mehta, San Francisco, CA (US); Ralph Christopher S. Castillo, San Francisco, CA (US); Darrel Alvin N. Ong, San Francisco, CA (US); Eric John Ll. Arnaldo, San Francisco, CA (US)

(73) Assignee: SPLENDID LABS, INC., San Francisco, CA (US)

( * ) Notice: Subject to any disclaimer, the term of this patent is extended or adjusted under 35 U.S.C. 154(b) by 0 days.

(21) Appl. No.: 14/183,374

(22) Filed: Feb. 18, 2014

(51) Int. Cl.
G06Q 30/00 (2012.01)
G06Q 30/06 (2012.01)

(52) U.S. Cl.
CPC .................................. *G06Q 30/0631* (2013.01)

(58) Field of Classification Search
USPC ............................................... 705/26.1–27.2
See application file for complete search history.

(56) References Cited

U.S. PATENT DOCUMENTS

| 8,341,538 B1* | 12/2012 | Antczak et al. ............... 715/764 |
| 2007/0238520 A1* | 10/2007 | Kacmarcik ..................... 463/33 |
| 2008/0304698 A1* | 12/2008 | Rasmussen et al. .......... 382/100 |
| 2009/0249189 A1 | 10/2009 | Jania et al. |
| 2011/0047462 A1 | 2/2011 | Butin et al. |
| 2011/0047488 A1 | 2/2011 | Butin et al. |
| 2011/0047514 A1 | 2/2011 | Butin et al. |
| 2011/0145109 A1* | 6/2011 | Watson ........................ 705/27.2 |
| 2011/0312414 A1 | 12/2011 | O'Donnell |
| 2012/0170836 A1* | 7/2012 | Henry et al. .................. 382/162 |
| 2013/0217335 A1 | 8/2013 | Huibers et al. |
| 2013/0268832 A1* | 10/2013 | Vemireddy .................... 715/206 |
| 2013/0318083 A1 | 11/2013 | Han et al. |
| 2014/0055484 A1* | 2/2014 | Moon et al. ................... 345/593 |
| 2014/0089145 A1* | 3/2014 | Sunkada .................... 705/26.63 |

OTHER PUBLICATIONS

Wang, J., Zhao, Z., Zhou, J., Wang, H., Cui, B., & Qi, G. (2012). Recommending flickr groups with social topic model.Information Retrieval, 15(3-4), 278-295. doi:http://dx.doi.org/10.1007/s10791-012-9193-0 [recovered from ProQuest on Jun. 6, 2014].*
Mollah et al., "Segmentation of Camera Captured Business Card Images for Mobile Devices," *International Journal of Computer Science and Applications*, vol. 1, Issue 1, pp. 33-37, Jun. 2010.

* cited by examiner

*Primary Examiner* — Kathleen Palavecino
(74) *Attorney, Agent, or Firm* — Foley & Lardner LLP

(57) ABSTRACT

Provided are computer systems, methods, and non-transitory computer-readable medium configured for analyzing and using screenshots. The analysis and use can entail receiving a screenshot comprising identifying information of a merchandise, retrieving a candidate merchandise, offered for sale by a vendor, which candidate merchandise is a potential match to the merchandise according to the identifying information; and displaying the candidate merchandise.

22 Claims, 5 Drawing Sheets

SCREENSHOT-BASED E-COMMERCE

BACKGROUND

With the widespread use of smartphones and their increased performance, people now are turning more to their smartphones for activities that used to be carried out primarily on computers. Such activities include, for instance, shopping and networking. While many of such activities are conducted on web browsers of the phone, more and more can be done through dedicated application software programs, which are often times referred to as "apps."

Both web browsers and apps on a smart phone, however, have limited functionality given the relatively small size of screens and the lack of precision of touches which are the primary operator of a smart phone. For instance, copy/paste on a smart phone can be difficult to operate and may even be restricted in certain apps. Typing, likewise, is difficult. Therefore, when a user sees an interesting product on a webpage or an app, and if the user is interested in purchasing the product, in particular from a different vendor, the user will have to memorize the product's name or identification and then use that information to search for the product on a different website.

There is therefore a need to allow a user to capture information from any website or app and enable the user to use that captured information to achieve the user's intended goal. The goal may be apparent from the information captured per se, such as purchasing a product, checking price at different vendors, or tracking price or availability of the product, if a product is displayed on the website or app.

SUMMARY

The present disclosure provides computer systems, methods, and non-transitory computer-readable mediums configured for analyzing and using screenshots. The analysis and use can entail receiving a screenshot comprising identifying information of a merchandise, retrieving a candidate merchandise offered for sale by a vendor, finding a potential match for the candidate merchandise according to the identifying information, and displaying the candidate merchandise.

In one embodiment, provided is a system comprising a processor, memory and program code which, when executed by the processor, configures the system to: (a) receive a screenshot comprising identifying information of a merchandise; (b) retrieve a candidate merchandise, offered for sale by a vendor, which candidate merchandise is a potential match to the merchandise according to the identifying information; and (c) display the candidate merchandise.

In some aspects, a price or an availability of the candidate merchandise is displayed.

In some aspects, the merchandise is selected from the group consisting of a service, a tangible good and a digital good.

In some aspects, the identifying information is selected from the group consisting of name, stock keeping unit, bar code, identification number, identification code, description, merchandise image, merchandise video, color, vendor, manufacturer, inventory level, internet address and price.

In some aspects, the candidate merchandise is displayed on an interface configured to allow a user to bookmark the candidate merchandise, to retrieve more information of the candidate merchandise, or make a purchase of the candidate merchandise. In some aspects, the bookmarking tracks updates of the candidate merchandise.

In some aspects, the code further configures the system to initiate a search in an image inventory to identify an image that is potentially a screenshot.

In some aspects, the code further configures the system to monitor generation of screenshots.

In some aspects, the code further configures the system to initiate generation of a screenshot.

In some aspects, the code further configures the system to send a user a notification when price or availability of the candidate target merchandise changes.

In some aspects, the notification is a screen instant notification, a text message, a push notification, an electronic instant message, or an email message.

In some aspects, the code further configures the system to identify an application software located on the system or a website that likely generates the image in the screenshot.

In some aspects, the code further configures the system to identify one or more segments of the screenshot as potentially containing the identifying information.

In some aspects, the code further configures the system to classify at least one of the segments.

In some aspects, the segments are classified to a category selected from the group consisting of name, identification number, identification code, description, merchandise image, video, vendor, manufacturer, internet address and price.

In some aspects, the code further configures the system to generate a fingerprint of the screenshot, which fingerprint comprises at least one of geometric, semantic and morphological features of the screenshot.

In some aspects, the code further configures the system to recognize the identifying information.

In some aspects, the code further configures the system to identify a source website or a source application software from which the screenshot is derived.

In some aspects, the code further configures the system to verify the recognized identifying information with the source website or source application software.

Also provided, in one embodiment, is a system comprising a processor, memory and program code which, when executed by the processor, configures the system to: (a) receive a screenshot of a webpage or an application software; (b) identify a source website or a source application software from which the screenshot is derived; (c) predict an intended use of information presented in the screenshot based on recognized information from (i) the screenshot and (ii) the source website or a source application software; and (d) provide an interface to enable the user to carry out the intended use.

In some aspects, the code further configures the system to verify the recognized information with the source website or source application software.

In some aspects, the intended use is selected from the group consisting of (i) storing the content, or a bookmark to the website or the app, (ii) making a purchase of a merchandise or service presented on the screen, (iii) initiating a communication or building a social network with a contact displayed on the screen, and (iv) conducting a search relevant to the content of the screen.

BRIEF DESCRIPTION OF THE DRAWINGS

Provided as embodiments of this disclosure are drawings which illustrate by exemplification only, and not limitation, wherein.

It will be recognized that some or all of the figures are schematic representations for exemplification and, hence, that they do not necessarily depict the actual relative sizes or locations of the elements shown. The figures are presented for the purpose of illustrating one or more embodiments with the explicit understanding that they will not be used to limit the scope or the meaning of the claims that follow below.

DETAILED DESCRIPTION

This disclosure provides computer systems and methods to capture information from the screen of a device and then enable a user to use the captured information. In addition, the captured information can be analyzed to facilitate the use of the information by the user. Also provided in the disclosure are methods to carry out such analysis and use.

Thus, in one embodiment, the present disclosure provides system comprising a processor, memory and program code which, when executed by the processor, configures the system to (a) receive a screenshot comprising identifying information of a merchandise; (b) retrieve a candidate merchandise, offered for sale by a vendor, which candidate merchandise is a potential match to the merchandise according to the identifying information; and (c) display the candidate merchandise.

Use of the captured information from a screenshot is limited to commerce, however. For instance, in another embodiment, the present disclosure provides a system comprising a processor, memory and program code which, when executed by the processor, configures the system to (a) receive a screenshot of a webpage or an application software; (b) identify a source website or a source application software from which the screenshot is derived; (c) predict an intended use of information presented in the screenshot based on recognized information from the screenshot and the source website or a source application software; and (d) provide an interface to enable the user to carry out the intended use.

Also provided are methods that include such steps, implemented on a suitably programmed computer. Still further provided are non-transitory computer-readable medium that comprises program codes to implement these methods.

Screenshot

Figure 1A:
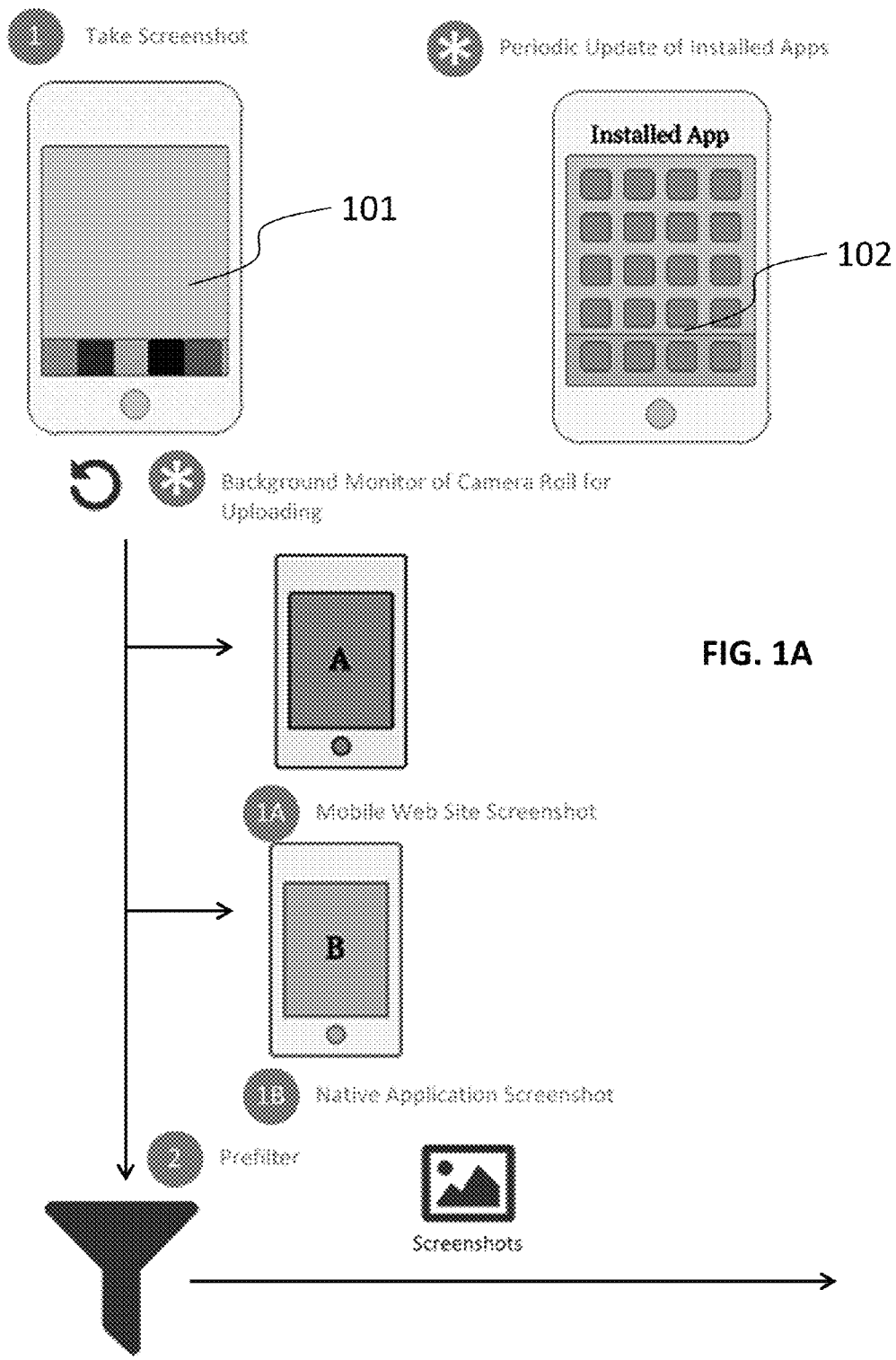
FIG. 1A-D illustrate the process of acquiring a screenshot and extracting information from the screenshot for further user use.

In one embodiment, the method begins with receiving a screenshot (see, e.g., 101 in FIG. 1A). A "screenshot" refers to an image taken on a computing device to record content displayed on a monitor, television, or another visual output device. In one aspect, a screenshot is a digital image captured using the operating system or software running on the computing device. In another aspect, it can be a capture made by a camera or a device intercepting the video output of the display.

In one aspect, a screenshot includes all visible items displayed. Yet in some aspects, a screenshot includes only a particular windows or graphic interface. In some aspects, a screenshot includes menus or menu buttons, such as the "back", "refresh" or "home" buttons of an application software on a smartphone screen. In some aspects, a screenshot includes only the prominent portion of a screen, without the menu items.

In a particular embodiment, a screenshot includes the entire screen of a smartphone that is captured by a native function of the operating system running on the smartphone. In some aspects, the screenshot is taken when the screen is occupied by a web browser (e.g., screenshot A in FIG. 1A), a native application software (e.g., screenshot B in FIG. 1A) of the operating system, or a user-installed application software.

The method (or the system which is configured to carry out the method, likewise throughout the disclosure) of the present disclosure can trigger the underlying operating system, a camera software, or a screen capture software to take a screenshot (e.g., step 1 in FIG. 1A), can take a screenshot on its own, or alternatively scan a screenshot repository (e.g., step * in FIG. 1A) to identify a suitable screenshot to use, without limitation.

In one embodiment, the method monitors a system for generation of screenshots. Upon generation of a screenshot, the method automatically commences further analysis of the screenshot, as further described below.

When searching for a screenshot on the system, in one aspect, the method can prompt a user to select an image as a candidate screenshot. In another aspect, the method can scan a default or user-defined directory or folder for candidate screenshots. When searching for the screenshots, in one aspect, the method starts with images that were most recently generated.

Screenshot Validation and Pre-Filtering

In some aspects, the method further verifies whether a received candidate image is a screenshot. Such verification can be carried out with various methods and standards. For instance, the method can check whether the size or aspect ratio of the screenshot matches a screen of the system. In a related aspect, the method further entails determining the type of the device that displays the content of the image, so that one can use that to validate the screenshot with the device type in terms of height, width, display technology, and/or resolution.

Optionally, the screenshot can undergo a pre-filtering step (e.g., step 2 in FIG. 1A), which is configured to identify a source software program on the system from which the screenshot is derived. For instance, a color palette or background image or color can be generated from the screenshot and compared to those of websites and application software in a database.

In one embodiment, the method has an intended use, such as e-commerce. In such a case, the screenshot can further be checked to determine whether suitable identifying information of a merchandise is included. Such determination can be carried out, for instance, by taking extracted features of the screenshot as input in a machine learning approach to be compared to screenshot images in a training dataset.

As used here, the term "merchandise" refers to any good or service that is the subject of a commercial transaction. The good can be a tangible good (e.g., a book), a digital good (e.g., a banner advertisement, a song, or an e-book), an intellectual property (e.g., a trademark), a real property (e.g., an office building or a piece of land) or an entity (e.g., a company), without limitation. The service can be conventional service or digital service too.

The "identifying information" of a merchandise includes, without limitation, name, stock keeping unit, identification number, identification code, description, merchandise image, video, vendor, manufacturer, internet address, price, color, size and availability.

Screenshot Segmentation and Segment Classification

Even though the entire screenshot can be analyzed as a single unit, such as for optical character recognition (OCR), segmentation of the screenshot prior to OCR is proven to improve the analysis. Screenshot (image) segmentation can be done with methods known in the art and those further described herein.

In computer vision, image segmentation is the process of partitioning a digital image into multiple segments (sets of pixels). Image segmentation can be used to locate objects and boundaries (lines, curves, etc.) in images. In some aspects, image segmentation is the process of assigning a label to every pixel in an image such that pixels with the same label share certain visual characteristics.

Examples of methods for image segmentation include, without limitation, thresholding, clustering methods, compression-based methods, histogram-based methods, edge detection, region-growing methods, split-and-merge methods, partial differential equation-based methods, level set methods, fast marching methods, graph partitioning methods, watershed transformation, model-based segmentation, multi-scale segmentation, one-dimensional hierarchical signal segmentation, image segmentation and primal sketch, semi-automatic segmentation, trainable segmentation, and segmentation benchmarking.

The result of screenshot segmentation is a set of segments that collectively cover the entire image, or a set of contours extracted from the screenshot. Each of the pixels in a region are similar with respect to some characteristic or computed property, such as color, intensity, or texture. Adjacent regions are significantly different with respect to the same characteristics.

In some aspects, segments of interest (e.g., segments that potentially carry information useful for analyzing the screenshot) can be identified. For instance, in one embodiment, the segments can be classified into information categories, such as name, identification number, identification code, description, merchandise image, video, vendor, manufacturer, internet address, and price.

Classification of segments can be carried out with various methods including, such as heuristic, statistical, and machine learning techniques.

In one aspect, the classification uses a machine learning approach, which can include a training data set. In some aspects, the training data set includes data such as raw images, labeled images with bound box information, text located in the bounding boxes, feature images such as logos, browser features, and native application software features (e.g., navigation bars, tool bars, icons and tab bars).

Such classification can be helpful for subsequent screenshot analysis. For instance, if a segment is classified as a logo, then there is no need to OCR the segment, which will then improve the performance of the analysis of that segment. As another example, if a segment is classified as including price, then it would not be later recognized as to include a merchandise identification number.

Segment Analysis

Once segments are generated from a screenshot and optionally classified, then the segments can be further analyzed. One goal of such analysis, without limitation, is to identify a potential source website or application software from which the screenshot is derived. For instance, if a user takes a screenshot on her iPhone® while using a shopping app provided by Amazon®, the segment analysis described here is able to identify the Amazon® app as the source application software.

In some aspects, analysis of the segments entails generation of a screenshot fingerprint (e.g., step 3 in FIG. 1B), based on which the screenshot can be matched to a source website or source application software in a database which optionally has already been profiled. The fingerprint, in some aspects, includes one or more of geometric, semantic and morphological features of the screenshot.

Thus, in one embodiment, the present disclosure provides methods and systems for analyzing a screenshot or segments of a screenshot. The method entails, in one aspect, (a) receiving a screenshot of a website or application software, or segments of the screenshot, (b) extracting at least one of geometric, semantic and morphological features of the screenshot; and (c) using the extracted geometric, semantic or morphological features to identify a candidate website or application software that is a potential match to the webpage of application software.

Geometric features include, without limitation, x and y coordinates and positions of the segments, and width and height of segments. Semantic features include, without limitation, whether the content in a segment is or is not numeric, keywords, known words, punctuation, lists or bullets, enumerations, language type and baseline. Morphological features include, without limitation, bold, italic, underlined, strikethrough, upper case, small capitals, subscript, superscript, font name, font size, scaling, spacing, alignment, left indent, right indent, number lines, boxed, and color.

Figure 1B:
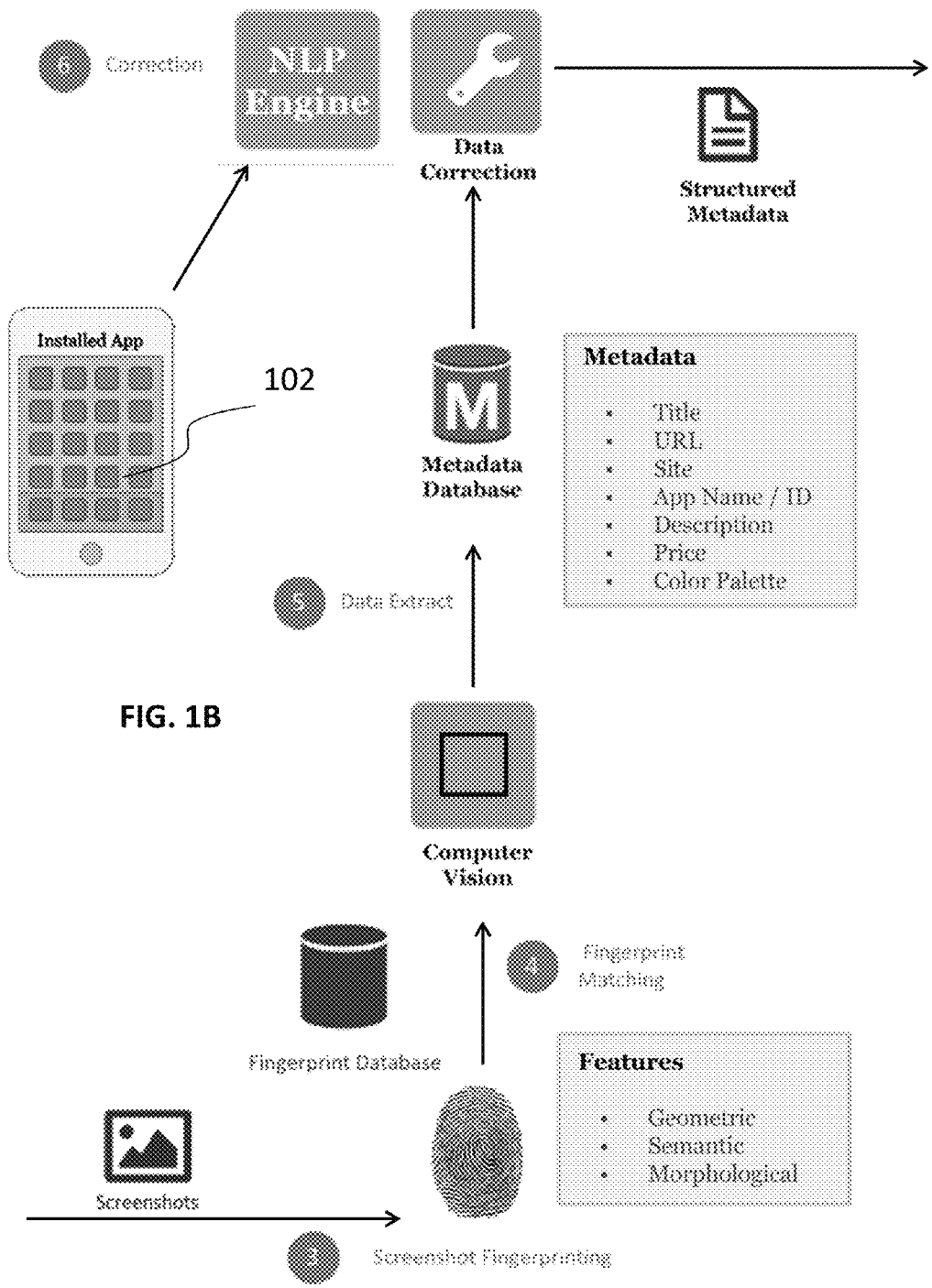

With such extracted features from the screenshot, the method then attempts to identify a source website or application software from which the screenshot is derived (e.g., step 4 in FIG. 1B). Identification of the source website can also be attempted at an earlier step, as described above, but the present identification step is likely to be more accurate with the additional information (e.g., screenshot fingerprint) based on segment analysis.

Meta Data Extraction and Validation/Correction

Following segmentation of the screenshot and the optional further analysis of the segments, content of the segments or selected segments can be extracted (e.g., step 5 in FIG. 1B). Such content, whether text, number, logos or images, can be referred to as "meta data."

With respect to text or numbers of the meta data, a conventional method of extracting such meta data is optical character recognition (OCR). OCR is the mechanical or electronic conversion of images of typewritten or printed text into machine-encoded/computer-readable text. There are two basic types of core OCR methods which may produce a ranked list of candidate characters. Matrix matching involves comparing an image to a stored glyph on a pixel-by-pixel basis; it is also known as "pattern matching" or "pattern recognition". This relies on the input glyph being correctly isolated from the rest of the image, and on the stored glyph being in a similar font and at the same scale. Another method is feature extraction that decomposes glyphs into "features" like lines, closed loops, line direction, and line intersections. These are compared with an abstract vector-like representation of a character, which can reduce to one or more glyph prototypes. Further, nearest neighbor classifiers such as the k-nearest neighbors algorithm are used to compare image features with stored glyph features and choose the nearest match.

Any information acquired at any previous step can be potentially useful during the OCR. For instance, if a segment is classified as a logo, then the segment does not require OCR, but rather can be matched to a known logo in a database by comparing pixels of the segment. Further, the font and font size detected previously, in another example, can assist the OCR and improve its recognition accuracy.

In addition or alternatively, any information acquired at any previous step can be used to validate or correct the OCR results (see step 6 in FIG. 1B). For instance, the merchandise name extracted by OCR can be compared to merchandises available from the previously identified source website or source application software. A perfect match suggests that the OCR was correct and a minor difference suggests that correction may be needed.

The validated and corrected meta data extracted from different segments can then be compiled as a meta data set to represent the screenshot. Such a complied meta data set, in some aspects, can further include the location and other geometric features of the data. In another aspect, the compiled meta data set is stored in a database with suitable labels or annotation, such as price, logo, URL (uniform resource locator), name of a merchandise.

Use of Information Extracted from the Screenshot

In the case of e-commerce, meta data extracted from the screenshot that are optionally validated with information provided by the identified source website or source application software can be used to identify one or more merchandises shown in the screenshot (see step 6 in FIG. 1B). Such identification information can be used to provide feedbacks to a user to assist the user's e-commerce objectives.

More generally, the meta data includes identifying information useful for a user, such as a contact for initiating a communication or network, or a keyword for an internet search. Such meta data can also be processed and presented to a user in a useful manner.

A. E-Commerce

Figure 1C:
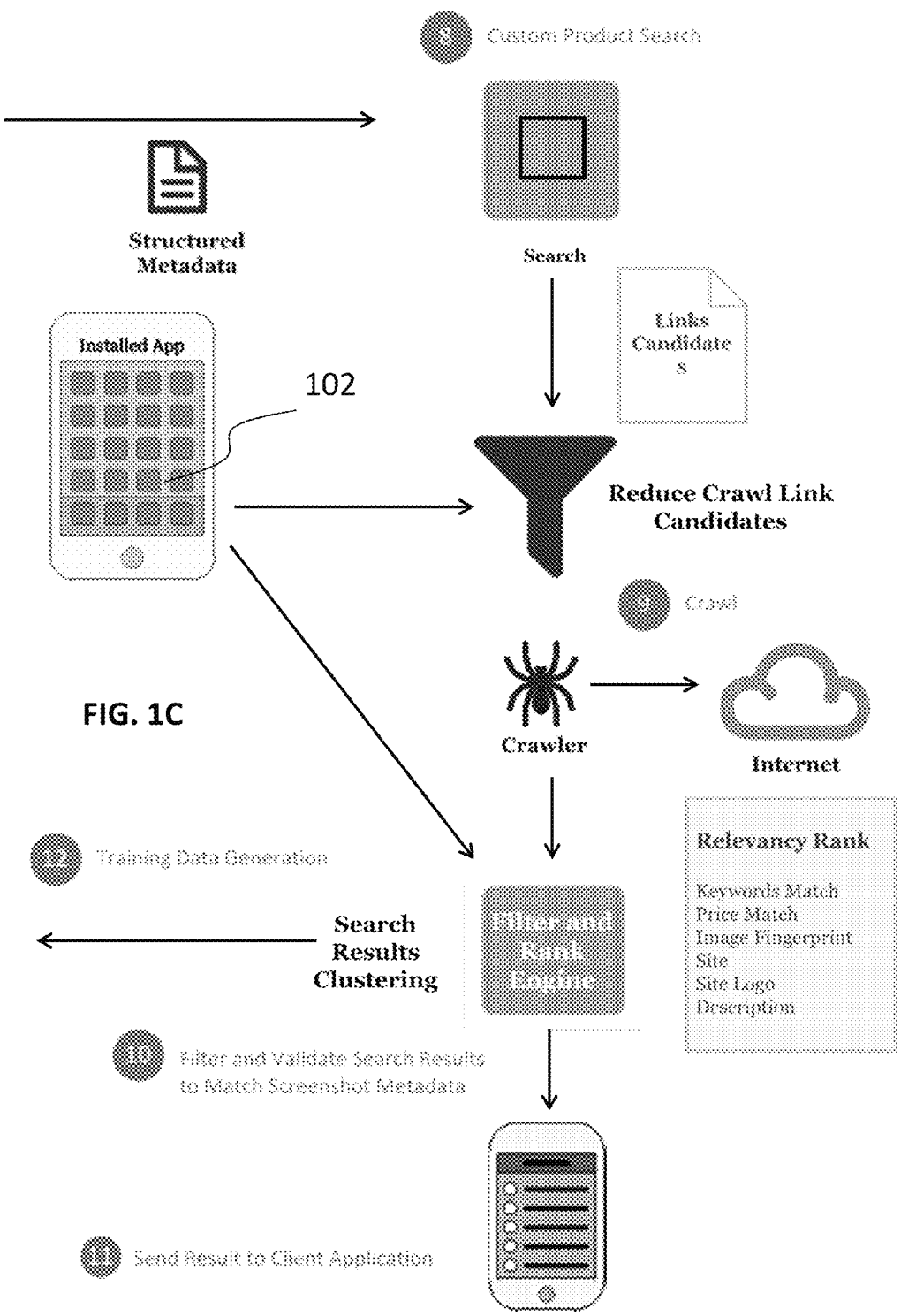

If a merchandise is identified from the screenshot, a search can be carried out to identify vendors that have the merchandise for sale (e.g., steps 8 and 9 in FIG. 1C). Accordingly, the methods and system can further be configured to display, on a user interface, information identifying the merchandise and associated price and availability. Further, in some aspects, the interface also displays further details, such as availability, color, size, and specification, of the merchandise and location and review of the vendor.

In some aspects, the search of vendors can be narrowed down to those vendors that have associated application software installed on the device. To this end, the present disclosure provides a means to detect what application software are installed on a device. Once a list of such software programs (e.g., 102 in FIG. 1A-C) is generated, the list can be used to limit, reduce or validate the search.

To make the interface more useful, in some aspects, the interface further includes mechanisms, such as links, menus and buttons, to allow a user to retrieve more information of the merchandise, or make a purchase of the merchandise.

Still, in some aspects, the interface also displays a different merchandise which is recommended by the system. The recommendation can be based on the merchandise identified from the screenshot or other factors, such as a user's location, shopping history in the past, or a particular vendor's sales or promotion.

In some aspects, the methods and systems of the present disclosure are further configured to bookmark the merchandise. As used herein, the term "bookmark" is not limited to a particular method of storing identifying information (e.g., web link or merchandise identification) so long as the identifying information is stored in either a user device or a server. Accordingly, the bookmark can be dynamic, keeping track of updates of the bookmarked merchandise.

In some aspects, the methods and systems can be configured to notify a user of updates of a merchandise. The notification, in one aspect, includes changes of price or availability, or recommended merchandises. Non-limiting examples of notification methods include a screen instant notification, a text message, an electronic instant message, or an email message.

In some aspects, when a screenshot is taken and submitted, the method can profile the user taking the screen using the visible date or time information on the screenshot. Such information will allow understanding of the user/application software interaction time and can be used to schedule notification accordingly.

B. Other Uses

As provided, the presently disclosed screenshot-based methods and systems are not limited to e-commerce. Depending on what information (meta data) is captured on a screenshot, the methods and systems can be configured to analyze the information and provide an interface or feedback to facilitate the use of such information by a user.

In some aspects, the methods and systems are configured to predict an intent by the user that generated the screenshot, or prompt the user to enter or annotate an intent. For instance, in one embodiment, the methods and systems are configured to enable a user to store or bookmark the information. In another embodiment, the methods and systems are configured to initiate a communication or building a social network with a contact extracted from the screenshot. In one embodiment, the methods and systems are configured to conduct a search relevant to the content of the screen.

FIG. 2A-F illustrate various uses of the present screenshot technology. For instance, if the screenshot contains a user profile (FIG. 2A), the meta data may include user photo, name, username, social network, and application source, and the present technology can enable or promote a user to add the contact as a friend. If the screenshot includes a video interface (FIG. 2B), with extracted meta data such as name of the video, username, time and application source, then the present technology can prompt or enable a user to share the video.

If the screenshot includes an application download page (FIG. 2C), with extracted meta data such as application name, ID or title, and application source, then the present technology can prompt or enable a user to download the application. If the screenshot includes a QR code (FIG. 2D), with extracted meta data including the code, then the present technology can prompt or enable a user to execute the QR code.

If the screenshot includes an audio interface (FIG. 2E), with extracted meta data such as the name of the audio, time of play and application source, then the present technology can prompt or enable a user to play the audio. If the screenshot includes a map interface (FIG. 2F), with extracted meta data such as start point, end point, and application source, then the present technology can prompt or enable a user to save the directions.

In one embodiment, an application software is identified based on the meta data as potentially generating the images captured in the screenshot. Subsequently, the method prompts or enables a user to download and/or install the application software.

Figure 1D:
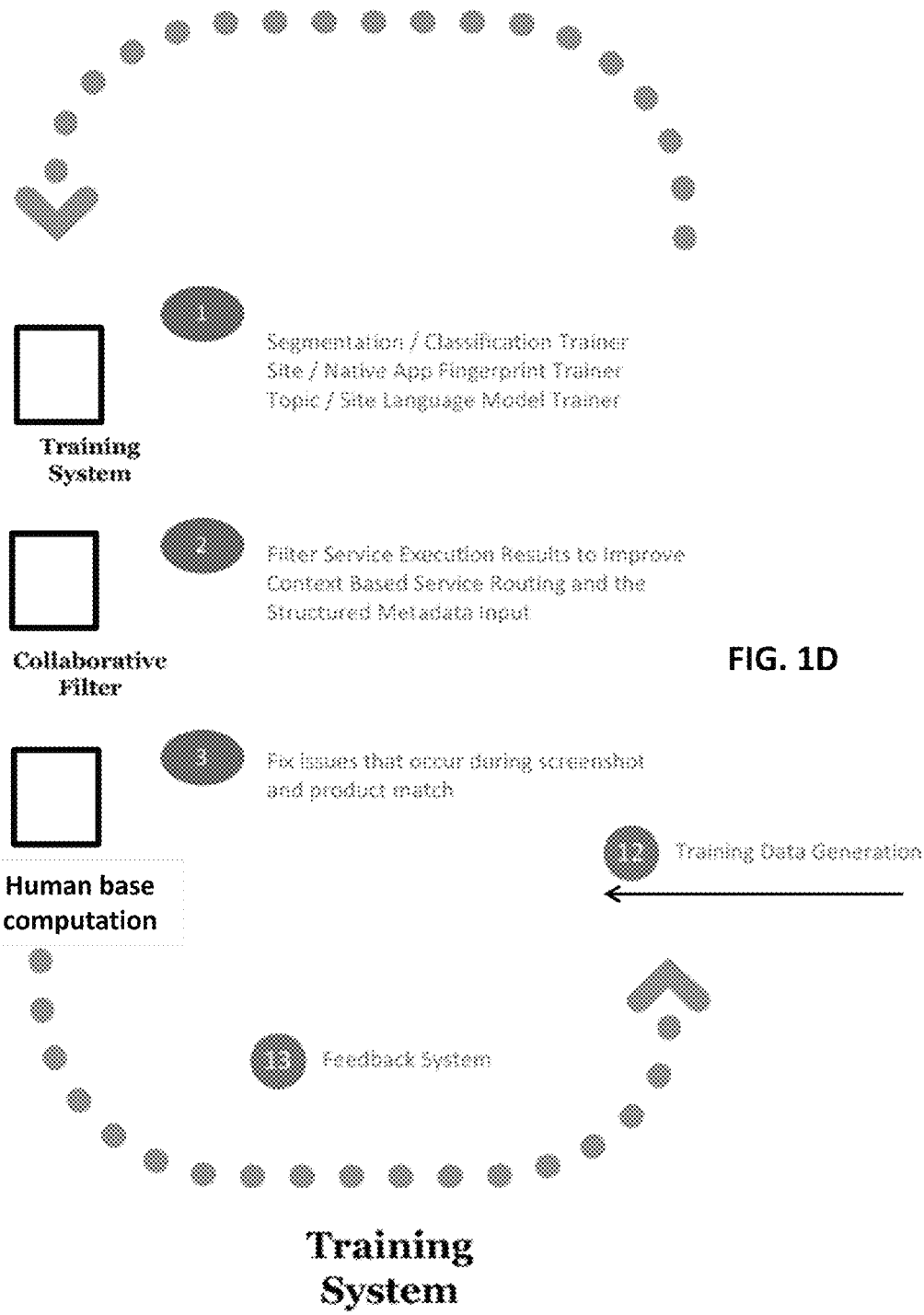
Figure 2:
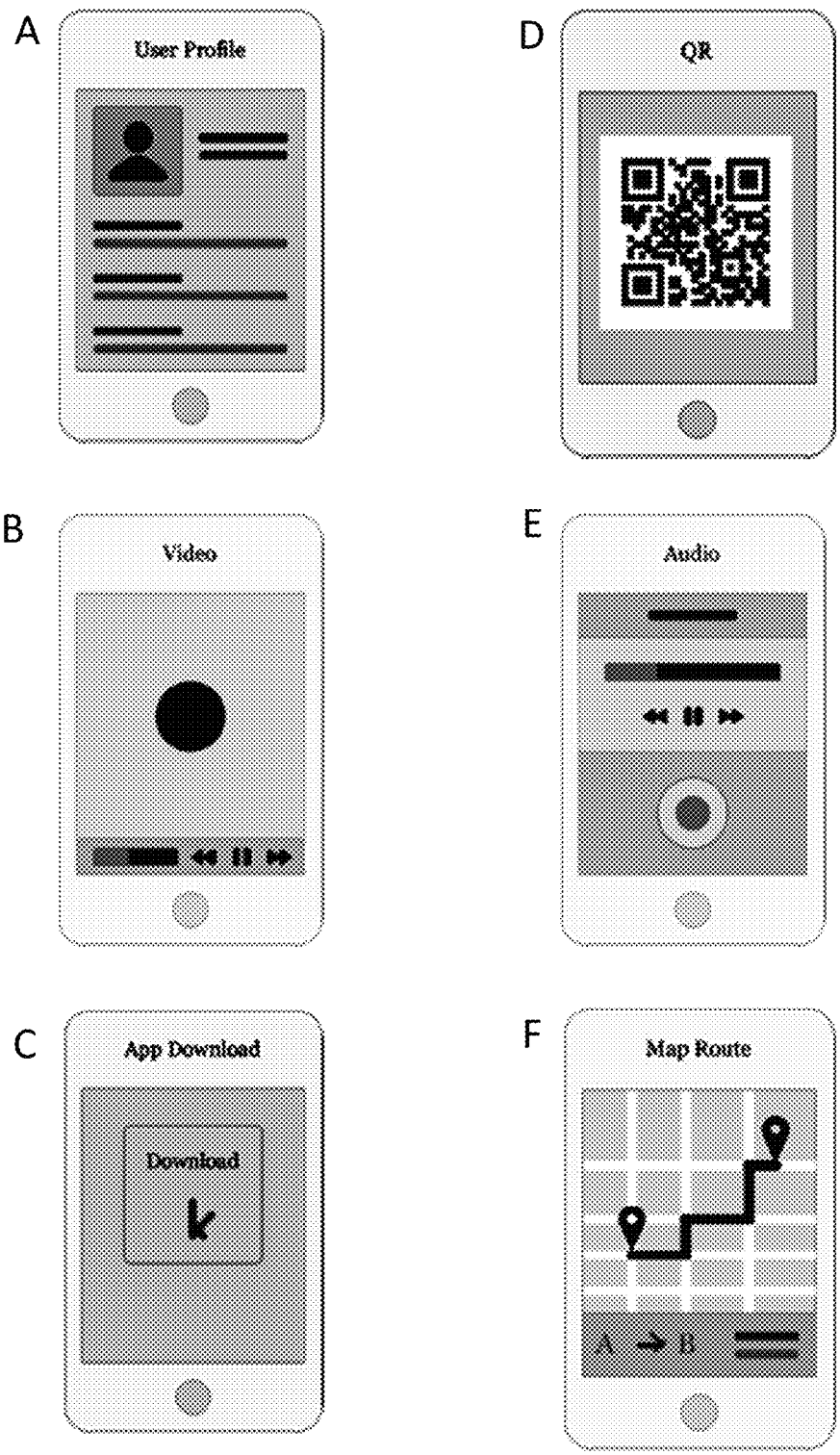
FIG. 2A-F illustrate various uses and types of meta data extracted from a screenshot, in addition to e-commerce.

In some aspects, any search results, validation results obtained above can be further analyzed (e.g., clustering, filtering as shown in FIG. 1C) or included in the training data to improve subsequent analysis. FIG. 1D illustrates a training system that uses such newly generated data.

Computer Systems and Network

The methodology described here can be implemented on a computer system or network. A suitable computer system can include at least a processor and memory; optionally, a computer-readable medium that stores computer code for execution by the processor. Once the code is executed, the computer system carries out the described methodology.

In this regard, a "processor" is an electronic circuit that can execute computer programs. Suitable processors are exemplified by but are not limited to central processing units, microprocessors, graphics processing units, physics processing units, digital signal processors, network processors, front end processors, coprocessors, data processors and audio processors. The term "memory" connotes an electrical device that stores data for retrieval. In one aspect, therefore, a suitable memory is a computer unit that preserves data and assists computation. More generally, suitable methods and devices for providing the requisite network data transmission are known.

Also contemplated is a non-transitory computer readable medium that includes executable code for carrying out the described methodology. In certain embodiments, the medium further contains data or databases needed for such methodology.

Embodiments can include program products comprising non-transitory machine-readable storage media for carrying or having machine-executable instructions or data structures stored thereon. Such machine-readable media may be any available media that may be accessed by a general purpose or special purpose computer or other machine with a processor. By way of example, such machine-readable storage media may comprise RAM, ROM, EPROM, EEPROM, CD-ROM or other optical disk storage, magnetic disk storage or other magnetic storage devices, or any other medium which may be used to store desired program code in the form of machine-executable instructions or data structures and which may be accessed by a general purpose or special purpose computer or other machine with a processor. Combinations of the above also come within the scope of "machine-readable media." Machine-executable instructions comprise, for example, instructions and data that cause a general purpose computer, special-purpose computer or special-purpose processing machine(s) to perform a certain function or group of functions.

Embodiments of the present disclosure have been described in the general context of method steps which may be implemented in one embodiment by a program product including machine-executable instructions, such as program code, for example in the form of program modules executed by machines in networked environments. Generally, program modules include routines, programs, logics, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the disclosure also may be practiced in distributed and cloud computing environments where tasks are performed by local and remote processing devices that are linked, by hard-wired links, by wireless links or by a combination of hard-wired or wireless links, through a communications network. In a distributed computing environment, program modules may be located in both local and remote memory storage devices.

Although the discussions above may refer to a specific order and composition of method steps, it is understood that the order of these steps may differ from what is described. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

Unless otherwise defined, all technical and scientific terms used herein have the same meaning as commonly understood by one of ordinary skill in the art to which this disclosure belongs.

The disclosures illustratively described herein may suitably be practiced in the absence of any element or elements, limitation or limitations, not specifically disclosed here. For example, the terms "comprising", "including," "containing," etc. shall be read expansively and without limitation. Additionally, the terms and expressions employed here have been used as terms of description and not of limitation; hence, the use of such terms and expressions does not evidence and intention to exclude any equivalents of the features shown and described or of portions thereof. Rather, it is recognized that various modifications are possible within the scope of the disclosure claimed.

By the same token, while the present disclosure has been specifically disclosed by preferred embodiments and optional features, the knowledgeable reader will apprehend modification, improvement and variation of the subject matter embodied here. These modifications, improvements and variations are considered within the scope of the disclosure.

The disclosure has been described broadly and generically here. Each of the narrower species and subgeneric groupings falling within the generic disclosure also form part of the disclosure. This includes the generic description of the disclosure with a proviso or negative limitation removing any subject matter from the genus, regardless of whether or not the excised material is described specifically.

Where features or aspects of the disclosure are described by reference to a Markush group, the disclosure also is described thereby in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions, will control.

Although the disclosure has been described in conjunction with the above-mentioned embodiments, the foregoing description and examples are intended to illustrate and not limit the scope of the disclosure. Other aspects, advantages and modifications within the scope of the disclosure will be apparent to those skilled in the art to which the disclosure pertains.

The invention claimed is:

1. A system comprising a processor, memory and program code which, when executed by the processor, configures the system to:
receive a screenshot of a display generated by a source application software, the screenshot comprising identifying information of a merchandise;
generate a color palette from the screenshot;
determine that the color palette matches a user interface of a source application software, to identify the source application software from which the screenshot is derived;
retrieve a candidate merchandise, offered for sale by a vendor, based on the identifying information and identification of the source application software; and
display the candidate merchandise,
wherein the code to retrieve the candidate merchandise further configures the system to recognize the identifying information from the screenshot, and to verify or correct the recognized identifying information with the source application software.

2. The system of claim 1, wherein a price or an availability of the candidate merchandise is displayed.

3. The system of claim 1, wherein the merchandise is selected from the group consisting of a service, a tangible good and a digital good.

4. The system of claim 1, wherein the identifying information is selected from the group consisting of name, identification number, identification code, description, merchandise image, video, vendor, manufacturer, internet address and price.

5. The system of claim 1, wherein the candidate merchandise is displayed on an interface configured to allow a user to bookmark the candidate merchandise, to retrieve more information of the candidate merchandise, or make a purchase of the candidate merchandise.

6. The system of claim 5, wherein the bookmarking tracks updates of the candidate merchandise.

7. The system of claim 1, wherein the code further configures the system to initiate a search in an image inventory to identify an image that is potentially a screenshot.

8. The system of claim 1, wherein the code further configures the system to monitor generation of screenshots.

9. The system of claim 1, wherein the code further configures the system to initiate generation of a screenshot.

10. The system of claim 1, wherein the code further configures the system to send a user a notification when a price or an availability of the candidate merchandise changes.

11. The system of claim 10, wherein the notification is a screen instant notification, a text message, a push notification, an electronic instant message, or an email message.

12. The system of claim 1, wherein the code further configures the system to identify the source application software located on the system or a website that likely generates an image in the screenshot.

13. The system of claim 1, wherein the code further configures the system to identify one or more segments of the screenshot as potentially containing the identifying information.

14. The system of claim 13, wherein the code further configures the system to classify at least one of the segments.

15. The system of claim 14, wherein the segments are classified to a category selected from the group consisting of name, identification number, identification code, description, merchandise image, video, vendor, manufacturer, internet address and price.

16. The system of claim 1, wherein the code further configures the system to generate a fingerprint of the screenshot, which fingerprint comprises at least one of geometric, semantic and morphological features of the screenshot.

17. The system of claim 1, wherein the code further configures the system to recognize the identifying information.

18. The system of claim 17, wherein the code further configures the system to identify a source website from which the screenshot is derived.

19. The system of claim 18, wherein the code further configures the system to verify the recognized identifying information with the source website.

20. The system of claim 1, wherein the code further configures the system to determine that the screenshot comprises a background image or a background color that is used on a user interface of the source application software.

21. A non-transitory computer-readable medium comprising program code which, when executed, configures a computing device to:
receive a screenshot of a display generated by a source application software, the screenshot comprising identifying information of a merchandise;
generate a color palette from the screenshot;
determine that the color palette matches a user interface of a source application software, to identify the source application software from which the screenshot is derived;
retrieve a candidate merchandise, offered for sale by a vendor, based on the identifying information and identification of the source application software; and
display the candidate merchandise,
wherein the code to retrieve the candidate merchandise further configures the computing device to recognize the identifying information from the screenshot, and to verify or correct the recognized identifying information with the source application software.

22. The non-transitory computer-readable medium of claim 21, wherein the code further configures the computing device to determine that the screenshot comprises a background image or a background color that is used on a user interface of the source application software.

* * * * *